United States Patent Office
3,449,310
Patented June 10, 1969

3,449,310
PROCESS FOR THE POLYMERIZATION
OF CYCLOOLEFINS
Gino Dall'Asta and Giovanna Carella, Milan, Italy, assignors to Montecatini Edison S.p.A., a corporation of Italy
No Drawing. Filed Feb. 10, 1966, Ser. No. 526,377
Claims priority, application Italy, Feb. 11, 1965, 2,889/65
Int. Cl. C08f 5/00, 1/56; C08g 33/00
U.S. Cl. 260—93.1
12 Claims

ABSTRACT OF THE DISCLOSURE

Cycloolefins are polymerized to linear unsaturated polymers having the structure of polyalkenamers in contact with catalysts prepared from a salt of tungsten or molybdenum, organometallic compounds or hydrides of Group II or III metals, and oxygenated compounds containing oxygen-oxygen bonds or an oxygen-hydrogen bond.

Prior disclosures

In prior applications our group has disclosed processes for preparing linear unsaturated polymers of cycloolefins, which polymers have the structure of polyalkeneamers, some of which are formed according to a reaction represented by the following schematic showing:

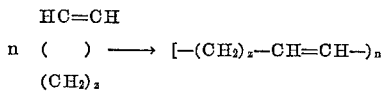

As disclosed in the earlier applications, said polymers can be prepared by polymerizing a non-substituted cycloolefin, wherein Z is equal to or higher than 3 except that Z is not 4, in contact with a catalytic system obtained by mixing a salt of a transition metal belonging to Groups IV–B or VI–B of the Mendelyeev Periodic Table with an organometallic compound or metal hydride of a metal belonging to Groups I–A, II or III of said Periodic Table.

According to those earlier-disclosed processes, it is convenient to operate so that the polymerization mixture only consists of the monomer to be polymerized and of the catalytic mixture, more particularly by avoiding the presence of substances which could react with the catalyst, such as, for example water, oxygen and carbon dioxide. An inert hydrocarbon, on the contrary, may be used but is not necessary.

The present invention

One object of this invention is to provide a new and improved process for the polymerization of cycloolefins to linear unsaturated polymers having the structure of polyalkenamers in high yields and at high polymerization rates.

This and other objects which will be apparent from the description given hereinafter are accomplished by the present invention in accordance with which the selected cycloolefins are polymerized in contact with a catalyst obtained by mixing:

(1) A salt of a transition metal selected from the group consisting of molybdenum and tungsten; with (2) An organometallic compound or hydride of a metal belonging to Groups II or III of the Mendeleyeev Periodic Table, the metal preferably being aluminum, beryllium, zinc, magnesium or calcium; and with (3) Molecular oxygen or an oxygenated compound containing an oxygen-to-oxygen or oxygen-to-hydrogen bond.

Non-limiting examples of molybdenum or tungsten salts which are useful as catalyst-forming component (1) include $MoCl_5$; $MoF_5$; $MoO_2Ac_2$ (where Ac represents acetylacetonate); $MoCl_2Ph_3$ (where Ph represents phenolate); $WCl_5$; $WCl_6$; $WOCl_4$; $WO_2Cl_2$; $WF_6$; $W_2Cl_6Pr_3$ (where Pr represents pyridinate). Particularly satisfactory results are obtained using $WCl_6$; $WOCl_4$; and $MoCl_5$.

Non-limiting examples of organometallic compounds and metal hydrides which are useful as catalyst-forming components (2) include $Al(C_2H_5)_3$; $Al(i-C_4H_9)_3$;

$Al(n-C_6H_{11})_3$; $Al(C_6H_5)_3$; $Al(C_2H_5)_2Cl$; $Al(C_2H_5)Br$
$Al(C_2H_5)_2F$; $AlC_2H_5Cl_2$; $AlH(i-C_4H_9)_2$; $AlH_3$
$Al(C_2H_5)_2OC_2H_5$; $Be(C_2H_5)_2$; $Mg(C_2H_5)_2$
$Mg(C_6H_5)_2$; $MgC_6H_5Br$; $Zn(C_2H_5)_2$; $ZnC_2H_5Br$
$Zn(n-C_4H_9)_2$; $CaHC_2H_5$

Particularly satisfactory results are obtained by using alkyldichlorides, such as e.g., $Al(C_2H_5)_3$; $Al(i-C_4H_9)_3$; $Al(C_2H_5)_2Cl$, $AlC_2H_5Cl_2$.

The ratios between transition metal salt and organometallic compound or metal hydride are conveniently selected in a range of molar ratios between 1:0.5 and 1:100.

When using aluminum trialklys or beryllium dialkyls, these molar ratios are best selected in the range from 1:1 to 1:5. When using metal hydrides, alkyl hydrides, or alkyl halides of the metals specified under (2), however, it is best to select molar ratios in the range from 1.3 to 1:20.

The oxygenated compound containing an oxygen-to-oxygen bond or an oxygen-to-hydrogen bond used as catalyst-forming component (3) is suitably selected from the group consisting of dialklperoxides; diarylperoxides; diacylperoxides; alkylhydroperoxides; arylalkylhydroperoxides; peracids; and their esters; peroxides of ketones, aldehydes, and acetals; hydrogen peroxide; alcohols and water.

Non-limiting examples of specific oxygenated compounds which may be used in preparing the catalyst are benzoyl peroxide, di tert. butylperoxide, dicumyl peroxide, tert. butyl hydroperoxide, cumene hydroperoxide, paracetic acid, p-chlorobenzoyl peroxide, cyclohexanoneperoxide, hydrogen peroxide, methanol, ethanol, n-butanol and water. Particularly satisfactory results are obtained with the various aforementioned peroxides and hydroperoxides.

The molar ratio between the selected transition metal salt and oxygenated compound is selected in the range from 1:2 to 1:0.1. Particularly satisfactory results are obtained when this ratio is 1:0.5. With this ratio easily reproducible molecular weights of the polyalkenamers are obtained.

It will be understood that the use of oxygenated compounds or mixtures thereof which, due to chemical transformation, generate compounds analogous to the oxygenated compounds mentioned specifically hereinabove and have the same effect on the catalytic mixture as the listed oxygenated compounds, are within the scope of the invention and may be used in the practice thereof.

The molar ratio between transition metal salt and monomer is selected in a range between 1:50 and 1:10,000. Particularly satisfactory results are obtained by selecting these ratios in the range from 1:200 to 1:2,000.

The order of addition between the various components of the catalytic mixture can be varied. It is, however, best not to add the oxygenated substance to the organometallic compound or metal hydride either purse, or diluted in the monomer.

The most suitable order of addition of the reactants proved to be the following one: monomer, oxygenated compound, transition metal compound and, finally, when the mixture has been brought to the desired polymerization temperature, the organometallic compound or metal hydride.

The polymerization of the cycloolefins according to the present process can be carried out in the presence of an inert diluent, such as an aliphatic, cycloaliphatic, aromatic or arylaliphatic hydrocarbon, for example toluene, n-heptane, cyclohexane. Best results are obtained, however, in the absence of a diluent, by carrying out the polymerizations of the cycloolefins in the presence of only the aforementioned catalytic mixture.

Cycloolefins which can suitably be polymerized to polyalkenamers according to the present invention are the nonsubstituted mono-olefins in which the double bond is in the hydrocarbon ring, excluding cyclohexene. Non-limiting examples of cycloolefins polymerizable to polyalkenamers according to the present process are cyclopentene, cycloheptene, cyclooctene and cyclododecene.

Mixtures of these cycloolefins can be copolymerized to copolymers containing units derived from the various cycloolefins, as units of alkenamers.

The polymerization of cycloolefins to polyalkenamers according to the present invention can occur either in a non-stereospecific manner or in a stereospecific manner. This means that the double bonds contained in the monomeric units of the polyalkenamers can be either all cis, or all trans, or some cis and some trans. Also, the double bonds may have prevailingly one of the two cis and trans types of configuration. A marked stereospecificity of cis or trans type of the double bonds depends on the particular cycloolefin polymerized and on the nature of the transition metal salt used.

The polymerization is generally carried out at a temperature from 80° C. to +60° C. It is preferable to operate at temperatures from −50 to +50° C.

The homopolymers prepared according to the present invention can be used, for example, in the field of elastomers, rubbers, expanded articles and of thermosetting resins.

Surprisingly, by the process of this invention, the cycloolefins are polymerized to the linear unsaturated polymers having the structure of polyalkenamers at a rate which is remarkably higher than the polymerization rate attained when using the prior processes referred to hereinabove. For example, using the present process, it is possible to obtain a polypentenamer from cyclopentene within a polymerization time period which is from 2 to 20 times shorter than the time required to obtain the same amount of polymer using the catalysts disclosed for use in the earlier processes. In the same polymerization time, the yield of polyalkenamer obtained by the present process is from 2 to 6 times larger than is obtained by the earlier processes.

In many instances, it is possible, by the present process, to polymerize the cycloolefins to high yields (of the order of 30–50%) of polyalkenamers, based on the amount of catalyst used, within a few minutes after the addition of the last component of the catalytic mixture to the monomer. This is possible without unfavorable effects resulting from the development of heat of polymerization, since the polymerization of the cycloolefins to the polyalkenamers under the present conditions is almost athermic, very little heat being given off by the reaction. This is in contrast to the polymerization of ethylenically unsaturated monomers, which involves the opening of double bonds with considerable development of heat which must be removed.

We also find that using the present process it is possible to achieve an effective control of the molecular weight of the polyalkenamer by selection of the molar ratio of the components of the catalytic mixture.

Moreover, using the present process it is also possible, at least in many instances, to effect polymerization of the cycloolefins stereospecifically, in the same manner as is possible when the earlier processes and catalysts referred to above are employed.

The following examples are given to illustrate the invention and are not to be construed as limitative.

Examples 1, 2, 13, 15, 17 and 19 were carried out under conditions as disclosed in the earlier applications mentioned hereinabove, for the purpose of demonstrating the difference between the results obtained according to those processes and the results obtained by the present improved process and as illustrated by Examples 3, 12, 14, 16, 18, 20 and 21.

Example 1

The polymerization vessel consists of a flask provided with a stirrer, nitrogen-inlet tube and tube for the introduction of the reactants. A dry nitrogen atmosphere is formed inside the flask and 10 ml. (7.7 g. =113 millimols) of cyclopentene are introduced. The whole is cooled to −30° C. and, while keeping the monomer under agitation, 0.188 millimol (0.075 g.) of tungsten hexachloride and then slowly 0.94 millimol of aluminium diethyl monochloride are added. The monomer to tungsten hexachloride molar ratio is 600:1; the aluminum diethyl monochloride to tungsten hexachloride molar ratio is 5:1.

The formation of polymer, observable from the increase in the viscosity of the mixture, starts after a short time. After 1 hour, when the mass in the flask has become compact, the polymerization is stopped by adding 20 cc. of methanol. The contents of the flask are poured into 100 cc. of methanol containing 5 ml. of 38% hydrochloric acid.

The polymer thus obtained is dissolved in 25 ml. of benzene containing 20 g. of phenylbetanaphthylamine. The solution is filtered and poured into 150 ml. of methanol. The polymer thus coagulated is suspended in fresh methanol containing 1% by weight of phenylbetanaphthylamine, and is finally dried under reduced pressure at room temperature. 1.45 g. of a solid, compact, non-tacky polymer having an intrinsic viscosity of toluene at 30° C. of 3.0 dl./g. are thus obtained. 19% of the monomer fed into the reactor was converted to polyalkenamer.

The polymer is soluble in aromatic hydrocrabons, such as benzene and toluene and in chlorinated hydrocarbons, such as carbon tetrachloride and chlorobenzene as well as in other types of solvents, such as carbon disulfide. It is insoluble in ketones such as acetone and methylethyl ketone, in alcohols such as methanol and butanol. The polymer obtained has the structure of a polypentenamer. It shows a typical infrared absorption spectrum in which the following characteristic bands are observable:

An intense band at 10.35 microns which indicates the presence of trans double bonds, in the proportion of 84%, referred to the monomeric units present;

A band at 7.1 microns which indicates the presence of cis double bonds, in the proportion of 16%, referred to the monomeric units present;

Practical absence of bands attributable to other types of unsaturations such as vinyl, vinylidene, allene, conjugated double bonds, etc.

Example 2

The polymerization of cyclopentene is carried out in the manner and under conditions of Example 1, with the difference that the polymerization time is 5 minutes instead of 1 hour.

The polymer is isolated and purified as in Example 1. It appears as a rubbery non-tacky solid in amount of 1.0 g. corresponding to a 12% conversion of the starting monomer. It has an intrinsic viscosity of 9.5 dl./g. in toluene at 30° C. and has properties similar to those of the polymer of Example 1. 62% of the polymerized cyclopentene units have trans configuration; 30% of said units have cis configuration.

Example 3

The polymerization of cyclopentene is carried out in the manner and under the conditions described in Example 1 but in the presence of an oxygenated compound.
The following reactants are used:

10 ml. (7.7 g.=113 millimols) of cyclopentene,
0.188 millimol (0.075 g.) of tungsten hexachloride,
0.94 millimol of aluminum diethyl monochloride,
0.188 millimol (0.46 g.) of benzoyl peroxide.

The monomer to tungsten hexachloride molar ratio is 600:1. The aluminum diethyl monochloride to tungsten hexachloride molar ratio is 5:1. The tungsten hexachloride to benzoyl peroxide molar ratio is 1:1.

Benzoyl peroxide is introduced into the cooled monomer before the tungsten hexachloride.

Otherwise, the procedure is as in Example 1. The polymerization is continued for 1 hour at the temperature of −30° C. It is then stopped and the polymer is isolated and purified as in Example 1.

3 g. of polymer (conversion of 39%) having properties similar to those of the product described in Example 1, with an intrinsic visocity in toluene at 30° C. of 4.6 dl./g., are thus obtained. The polymer which has the structure of a polypentenamer is in the form of a non-tacky elastomer. The examination of its infrared spectrum shows the presence of trans pentenamer units in a proportion of 80% and of cis pentenamer units in a proportion of 20% of the polymerized cyclopentene units present. Bands due to other types of unsaturations are practically absent.

Example 4

Cyclopentene is polymerized in the manner and under the conditions of Example 3, using the following reactants:

10 ml. (7.7 g.=113 millimols) of cyclopentene
0.188 millimol (0.075 g.) of tungsten hexachloride
0.94 millimol of aluminum diethyl monochloride
0.094 millimols (0.023 g.) of benzoyl peroxide.

The monomer to tungsten hexachloride molar ratio is 600:1, the aluminum diethyl monochloride to tungsten hexachloride molor ratio is 5:1. The tungsten hexachloride to benzoyl peroxide molar ratio is 1:0.5.

The polymerization is continued for 1 hour at the temperature of −30°. It is then stopped and the polymer is purified and isolated as in Example 1.

4.4 g. (conversion of 57%) of a product having properties and appearance similar to those of the product described in Example 3, with an intrinsic viscosity in toluene at 30° C. of 2.74 dl./g., are thus obtained. Examination of its infrared spectrum shows the presence of trans pentenamer units in the proportion of 92% and of cis pentenamer units in the proportion of 8% of the total polymerized cyclopentene units making up the macromolecules. Bands due to other types of unsaturation are practically absent.

Example 5

The polymerization of cyclopentene is carried out as and under the conditions described in Example 2 but in the presence of an oxygenated compound. The following reactants are used:

10 ml. (7.7 g.=113 millimols) of cyclopentene
0.188 millimol (0.075 g.) of tungsten hexachloride
0.94 millimol of aluminum diethyl monochloride
0.094 millimols (0.023 g.) of benzoyl peroxide.

The monomer to tungsten hexachloride molar ratio is 600:1. The aluminum diethyl monochloride to tungsten hexachloride molar ratio is 5:1. The tungsten hexachloride to benzoyl peroxide molar ratio is 1:0.5.

2.5 g. (conversion of 32%) or solid rubbery polymer having an intrinsic viscosity (in toluene at 30° C.) of 4.9 dl./g., are obtained. The polymer, which has properties similar to those of the polymer of Example 3, consists of polymerized cyclopentene units 79% of which have trans configuration and 21% of which have cis configuration.

Example 6

Cyclopentene is polymerized under the conditions described in Example 3, using the following reactants:

10 ml. (7.7 g.=113 millimols) of cyclopentene through which air at room temperature has been bubbled for one and one-half hours.
0.188 millimol (0.075 g.) of tungsten hexachloride
0.94 millimol of aluminum diethyl monochloride.

The monomer to tungsten hexachloride molar ratio is equal to 600:1; the aluminum diethyl monochloride to tungsten hexachloride is 5:1.

The polymerization is continued for 1 hour at the temperature of −30° C. It is then stopped and the polymer is isolated and purified as in Example 1.

There are thus obtained 4.1 g. (conversion of 53%) of polymer having properties and appearance similar to those of the polymer described in Example 3, and an intrinsic viscosity in toluene at 30° C. equal to 1.72 dl./g.

Examination of the infrared spectrum of this polymer shows the presence of units of trans pentenamer in a proportion of 82% and of cis pentenamer units in a proportion of 18%, of the total polymerized cyclopentene units. Bands due to other types of unsaturations are not detectable.

Example 7

The polymerization is carried out as and under the conditions described in Example 3, using the following reactants:

10 ml. (7.7 g.=113 millimols) of cyclopentene through which air at room temperature has been bubbled for 20 minutes
0.188 millimol (0.075 g.) of tungsten hexachloride
0.94 millimol of aluminum diethyl monochloride.

The monomer to tungsten hexachloride molar ratio is 600:1, the aluminum diethyl monochloride to tungsten hexachloride molar ratio is 5:1.

The polymerization is continued for 1 hour at the temperature of −30° C. It is then stopped and the polymer is isolated and purified as in Example 1.

There are thus obtained 1.9 g. (conversion of 25%) of polymer having properties and appearance similar to those of the polymer described in Example 3 and an intrinsic viscosity in toluene at 30° C of 4.2 dl./g.

From the examination of its infrared spectrum, the presence of trans pentenamer units in proportion of 85% and of cis pentenamer units in proportion of 15% of the total polymerized cyclopentene units present, is calculated. Bands due to other types of unsaturations are practically absent.

Example 8

The polymerization of cyclopentene is carried out as and under the conditions described in Example 3, using the following reactants:

10 ml. (7.7=113 millimols) of cyclopentene
0.188 millimol (0.075 g.) of tungsten hexachloride
0.94 millimol of aluminum diethylmonochloride
0.188 millimol of tert.butyl hydroperoxide.

The monomer to tungsten hexachloride molar ratio is 600:1; the aluminum diethyl monochloride to tungsten hexachloride molar ratio is 5:1; the tungsten hexachloride to hydroperoxide molar ratio is 1:1.

The polymerization is continued for 1 hour at the temperature of −30° C. It is then stopped and the polymer is purified and isolated as in Example 1.

2.1 g. (conversion of 27%) of polymer having properties and appearance similar to those of the polymer described in Example 3 are obtained. This polymer has an intrinsic viscosity in toluene at 30° C. of 5.9 dl.g.

From the examination of its infrared spectrum, the presence of trans pentenamer units in a proportion of 76% and of cis pentenamer units in a proportion of 24% in respect of the total polymerized cyclopentene units making up the macromolecules, is deduced.

Example 9

The polymerization of cyclopentene is carried out as and under the conditions described in Example 3, using the following reactants:

10 ml. (7.7 g.—113 millimols) of cyclopentene
0.188 millimol (0.075 g.) of tungsten hexachloride
0.94 millimol of aluminum diethyl monochloride
0.094 millimol of tert.butyl hydroperoxide.

The monomer to tungsten hexachloride molar ratio is 600:1; the aluminum diethyl monochloride to tungsten hexachloride molar ratio is 5:1; the tungsten hexachloride to hydroperoxide molar ratio is 1:0.5.

Proceeding as in Example 3, the polymerization is continued for 1 hour at the temperature of —30° C. It is then stopped and the polymer is isolated and purified as in Example 1.

3.95 g. (conversion of 51%) of polymer having properties and appearance similar to those of the polymer described in Example 2 are thus obtained. Its intrinsic viscosity in toluene at 30° C. is 3.87 dl./g.

From the examination of its infrared spectrum, the presence of trans pentenamer units in a proportion of 82% and of cis pentenamer units in a proportion of 18%, in respect of the total polymerized cyclopentene units present, is deduced.

Example 10

The polymerization of cyclopentene is carried out as and under the conditions described in Example 3, using the following reactants:

10 ml. (7.7 g.=113 millimols) of cyclopentene
0.188 millimol (0.075 g.) of tungsten hexachloride
0.94 millimol of aluminum diethyl monochloride
0.0181 ml. of hydrogen peroxide (120-vol.).

The monomer to tungsten hexachloride molar ratio is 600:1; the aluminum diethyl monochloride to tungsten hexachloride molar ratio is 5:1; the tungsten hexachloride to $H_2O_2$ molar ratio is 1:1.

The polymerization is left to proceed for 1 hour, is then stopped, and the polymer is isolated and purified as in Example 1.

2.6 g. (conversion 35%) of a polymer having characteristics similar to those of the polymer described in Example 2 are obtained; its intrinsic viscosity in toluene at 30° C. is 4.2 dl./g.

From the examination of its infrared spectrum, the presence of trans pentenamer units in a proportion of 82% and of cis pentenamer units in a proportion of 18%, in respect of the total polymerized cyclopentene units present, is deduced.

Example 11

The polymerization of cyclopentene is carried out as and under the conditions described in Example 3, using the following reactants:

10 ml. (7.7 g.=113 millimols) of cyclopentene
0.188 millimol (0.075 g.) of tungsten hexachloride
0.94 millimol of aluminum diethyl monochloride
0.188 millimol of water.

The cyclopentene to tungsten hexachloride molar ratio is 600:1; the aluminum diethyl monochloride to tungsten hexachloride molar ratio is 5:1; the tungsten hexachloride to water molar ratio is 1:1.

The polymerization is left to proceed for 1 hour at the temperature of —30° C., is then stopped, and the polymer is isolated and purified as described in Example 1.

2 g. (conversion of 26%) of polymer having an appearance and properties similar to those of the polymer obtained in Example 2, are produced. Its intrinsic viscosity in toluene at 30° C. is 2.97 dl./g.

From the examination of its infrared spectrum, the presence of trans pentenamer units in a proportion of 86% and of cis pentenamer units in a proportion of 14%, in respect of the total polymerized cyclopentene units making up the macromolecules, is deduced.

Example 12

The polymerization of cyclopentene is carried out as and under the conditions described in Example 3, using the following reactants:

10 ml. (7.7 g.=113 millimols) of cyclopentene
0.188 millimol (0.075 g.) of tungsten hexachloride
0.94 millimol of aluminum diethyl monochloride
0.094 millimol of ethanol.

The monomer to tungsten hexachloride molar ratio is 600:1; the aluminum diethyl monochloride to tungsten hexachloride molar ratio is 5:1; the tungsten hexachloride to ethanol molar ratio is 1:0.5.

The polymerization is left to proceed for 1 hour at —30° C. and is then stopped and the polymer is isolated and purified as in Example 1.

2.3 g. of polymer (conversion of 30%) having properties and appearance similar to those of the polymer described in Example 2 are thus obtained. Its intrinsic viscosity in toluene at 30° C. is 3.8 dl./g.

From the examination of its infrared spectrum, it can be deduced that trans pentenamer units are present in a proportion of 85% and cis pentenamer units are present in a proportion of 15% in respect of the total polymerized cyclopentene units making up the macromolecules.

Example 13

The polymerization of cyclopentene is carried out as and under the conditions of Example 1, using the following reactants:

10 ml. (7.7 g.=113 millimols) of cyclopentene
0.188 millimol of tungsten oxychloride ($WOCl_4$)
0.94 millimol of aluminum diethyl monochloride.

The monomer to tungsten oxychloride molar ratio is 600:1; the aluminum diethyl monochloride to tungsten oxychloride molar ratio is 5:1.

The polymerization is left to proceed for 1 hour at —30° C. and is then stopped. The polymer is isolated and purified as described in Example 1.

1.3 g. of polymer (conversion of 17%) having properties similar to those of the product described in Example 1 are obtained. The intrinsic viscosity in toluene at 30° C. is 9.2 dl./g.

The polymer consists of 77% of trans pentenamer units and 23% of cis pentenamer units, as determined by IR examination.

Example 14

The polymerization of cyclopentene is carried out as and under the conditions of Example 3, using the following reactants:

10 ml. (7.7 g.=113 millimols) of cyclopentene
0.188 millimol of tungsten oxychloride ($WOCl_4$)
0.94 millimol of aluminum diethyl monochloride
0.188 millimol of benzoylperoxide.

The monomer to tungsten oxychloride molar ratio is 600:1; the aluminum diethyl monochloride to tungsten oxychloride molar ratio is 5:1; the tungsten oxychloride to benzoyl peroxide molar ratio is 1:1.

The polymerization is left to proceed for 1 hour at —30° C., is then stopped and the polymer is purified as described in Example 1.

2.4 g. of polymer (conversion of 31%) having properties similar to those of the product described in Example 1 are obtained. The intrinsic viscosity in toluene at 30° C. is 5.2 dl./g.

The polymer consists of 72% of trans pentenamer units and of 28% of cis pentenamer units, as determined by IR examination.

Example 15

Cyclopentene is polymerized as described in Example 1, using the following reactants:

10 ml. (7.7 g.=113 millimols) of cyclopentene
0.226 millimol of molybdenum pentachloride
0.565 millimol of aluminum triethyl.

The monomer to molybdenum pentachloride molar ratio is 500:1; the triethyl aluminum to molybdenum pentachloride molar ratio is 2.5:1.

The polymerization is left to proceed for 4 hours at −30° C. It is then stopped and the polymer is isolated and purified as described in Example 1.

0.82 g. (conversion of 10.5%) of solid rubbery polymer having an intrinsic viscosity in toluene at 30° C. of 1.8 dl./g. is obtained.

The polymer has practically the structure of a pure cis polypentenamer. From the examination of its infrared spectrum, the presence of trans pentenamer units in proportion of 1% and of cis pentenamer units in proportion of 99% in respect of the total polymerized cyclopentene units present, is in fact deduced. Bands due to other types of unsaturations or to cyclic monomer units are not observed.

Example 16

The polymerization of cyclopentene is carried out as described in Example 3. The following reactants are used:

10 ml. (7.7 g.=113 millimols) of cyclopentene
0.226 millimol (0.061 g.) of molybdenum pentachloride
0.565 millimol of aluminum triethyl
0.113 millimol of tert.butyl hydroperoxide;

The monomer to molybdenum pentachloride molar ratio is 500:1, the aluminum triethyl to molybdenum pentachloride molar ratio is 2.5:1; the molybdenum pentachloride to hydroperoxide molar ratio is 1:0.5.

The polymerization is continued for 4 hours at −30° C. The polymer is isolated and purified as described in Example 1.

2.0 g. (conversion of 26%) of a solid rubbery polymer having an intrinsic viscosity in toluene at 30° C. of 2.26 dl./g. are thus obtained. This polymer (similarly to the polymer of Example 15) has practicaly the structure of a pure cis polypentenamer. From the examination of its infrared spectrum, the presence of trans pentenamer units in a proportion of 1% and of cis pentenamer units in a proportion of 99% of the total polymerized cyclopentene units present, is in fact deduced. Bands due to other types of unsaturations or to cycles are not observed.

Example 17

The polymerization of cis cyclooctene is carried out as described in Example 1, but using the following reactants:

10 ml. (8.2 g.=75 millimols) of cis cyclooctene
0.15 millimol of tungsten hexachloride
0.75 millimol of aluminum diethyl monochloride
2 ml. of anhydrous toluene.

The monomer to tungsten hexachloride molar ratio is 500:1; the aluminum diethyl monochloride to tungsten hexachloride molar ratio is 5:1. The diluent (toluene) is mixed with the monomer before the addition of the various components of the catalytic mixture.

The polymerization is continued for 3 hours at −40° C. and then for a further three and one-half hours at −25° C. and is then stopped. The polymer is isolated and purified as described in Example 1.

0.25 g. (conversion of 3%) of a non-tacky solid polymer having an intrinsic viscosity in toluene at 30° C. of 1.8 dl./g. is obtained. It is soluble, e.g., in most hydrocarbons and chlorinated solvents (such as benzene, toluene, carbon tetrachloride) but insoluble e.g., in many alcohols and ketones (such as methanol, acetone).

The structure, as determined by examination of the I.R. spectrum, is that of a practically pure polyoctenamer with cis and trans double bonds.

Example 18

The polymerization of cis-cyclooctene is carried out as and under the conditions described in Example 17, using the following reactants:

10 ml. (8.2 g.=75 millimols) of cis-cyclooctene
0.15 millimol of tungsten hexachloride
0.75 millimol of aluminum diethyl monochloride
0.15 millimol of benzoyl peroxide
2 ml. of anhydrous toluene.

The monomer to tungsten hexachloride molar ratio is 500:1; the aluminum diethyl monochloride to tungsten hexachloride molar ratio is 5:1; the tungsten hexachloride to benzoyl peroxide molar ratio is 1:1.

The polymerization is left to proceed for 3 hours at −40° C. and then for a further three and one-half hours at −25° C. and is then stopped. The polymer is isolated and purified as described in Example 1.

1.15 g. (conversion of 14%) of solid polymer having properties similar to those of the polymer of Example 17, and an intrinsic viscosity in toluene at 30° C. 2.4 dl./g., are obtained. It shows the structure of a practically pure polyoctenamer with cis and trans double bonds.

Example 19

The polymerization of cycloheptene is carried out as described in Example 1, using the following reactants:

10 ml. (85 millimols) of cycloheptene
0.170 millimol of tungsten hexachloride
0.85 millimol of aluminum diethyl monochloride.

The monomer to tungsten hexachloride molar ratio is 500:1 and the aluminum diethyl monochloride to tungsten hexachloride molar ratio is 5:1.

The polymerization is left to proceed for 4 hours at −30° C. and then for a further 38 hours at +15° C. The polymer is purified and isolated as described in Example 1.

0.8 g. (conversion of 9%) of solid polymer having an intrinsic viscosity in toluene at 30° C. of 0.75 dl./g. is obtained. It is soluble, e.g., in most hydrocarbons and chlorinated hydrocarbon solvents (such as benzene, toluene, carbon tetrachloride) but insoluble, e.g., in many alcohols and ketones (such as methanol, acetone).

The structure of the polymer, determined by examination of the I.R. spectrum, is that of a practically pure polyheptenamer in which the trans double bonds (61%) prevail over the cis double bonds (39%).

Example 20

The polymerization of cycloheptene is carried out as and under the conditions described in Example 19, using the following reactants:

10 ml. (85 millimols) of cycloheptene
0.170 millimol of tungsten hexachloride
0.85 millimol of aluminum diethyl monochloride.
0.170 millimol of benzoyl peroxide.

The monomer to tungsten hexachloride molar ratio is 500:1; the aluminum diethyl monochloride to tungsten hexachloride molar ratio is 5:1; the tungsten hexachloride to benzoyl peroxide molar ratios is 1:1.

The polymerization is left to proceed for 4 hours at −30° C., and then for a further 38 hours at +15° C. The polymer is isolated and purified as described in Example 1.

1.0 g. (conversion of 11%) of a non-tacky solid polymer having properties similar to those of the polymer of Example 19 and an intrinsic viscosity in toluene at 30° C. of 1.05 dl./g., is obtained. It also showns the structure of a practically pure polyheptenamer in which the trans double bonds (87%) predominate over the cis double bonds (13%).

Example 21

The polymerization of cyclopentene is carried out as and under the conditions of Example 3, using the following reactants:

10 ml. (7.7 g.=113 millimols) of cyclopentene
0.188 millimol of tungsten hexachloride
0.564 millimol of beryllium diethyl
0.094 millimol of benzoyl peroxide.

The monomer to tungsten hexachloride molar ratio is 600:1; the beryllium to tungsten hexachloride molar ratio is 3:1; the tungsten hexachloride to benzoyl peroxide molar ratio is 1:0.5.

The polymerization is left to proceed for 1 hour at −30° C. and is then stopped and the polymer is isolated and purified as indicated in Example 1. 0.8 g. (conversion 10%) of a solid rubbery polymer having an intrinsic viscosity in toluene at 30° C. of 1.8 dl./g. is obtained.

It has the structure of a polypentenamer in which, near cis double bonds, considerable amounts of trans double bonds are contained.

Results analogous to those obtained according to Examples 1–21 are obtained also by using cyclododecene as the monomer.

Example 22

The polymerization of cyclododecene is carried out in the manner described in Example 3, using the following reactants:

10 ml. (51.5 millimols) of cyclododecene (cis to trans mixture: 1:2)
0.103 millimol of tungsten hexachloride
0.515 millimol of aluminum diethyl monochloride
0.103 millimol of benzoyl peroxide.

The monomer to $WCl_6$ molar ratio is 500:1; the $Al(C_2H_5)_2Cl$ to $WCl_6$ molar ratio is 5:1; the $WCl_6$ to benzoyl peroxide molar ratio is 1:1.

The polymerization is left to proceed for 4 hours at −25° C. and then for 10 minutes at +50° C. The polymer formed is precipitated with methanol, filtered and dried.

4.3 g. (conversion 51%) of crude polymer are thus obtained.

The polymer is dissolved in boiling benzene and, after separation of a small portion of insoluble polymer by filtration, is precipitated again by pouring the solution into a methanol excess. The polymer obtained is a white fibrous solid having an intrinsic viscosity in chlorobenzene at 70° C. of 1.6 dl./g.

It is insoluble at room temperature, e.g., in many chlorinated hydrocarbons (such as chloroform or carbon tetrachloride) but soluble at temperature higher than 60° C. in these solvents as well as in aromatic hydrocarbons (such as benzene and toluene). It is insoluble, e.g., in many alcohols, ketones and aliphatic hydrocarbons (such as methanol, acetone, pentane).

The structure of the polymer, determined by infrared spectrum, is that of a pure polydodecenamer with trans double bonds in amount of 95% and cis double bonds in amount of 5% of the total double bonds present. The polymer appears to be highly crystalline when subjected to X-ray examination.

It will be apparent that changes and modifications in details may be made in practicing this invention, without departing from the spirit thereof. Therefore, we intend to include in the scope of the appended claims all such embodiments of the invention as will be obvious to those skilled in the art from the description and working examples given herein.

We claim:

1. A process for the polymerization of cycloolefins to linear unsaturated polymers having the structure of polyalkenamers, characterized in that the cycloolefins are polymerized in contact with a catalytic system prepared by mixing
    (a) a salt of a transition metal selected from the group consisting of tungsten and molybdenum,
    (b) a substance selected from the group consisting of organometallic compounds and hydrides of metals belonging to groups II and III of the Mendelyeev Periodic Table; and
    (c) an oxygenated compound selected from the group consisting of compounds containing oxygen-oxygen bonds and compounds containing an oxygen-hydrogen bond.

2. The process according to claim 1, characterized in that the oxygenated compound is selected from the group consisting of dialkyl peroxides, diaryl peroxides, diacyl peroxides, alkylhydroperoxides, arylalkyl hydroperoxides, peracids, esters of peracids, peroxides of ketones, peroxides of aldehydes, peroxides of acetals, molecular oxygen, hydrogen peroxide, alcohols and water.

3. The process according to claim 1, characterized in that the oxygenated compound is selected from the group consisting of benzoyl peroxide, di-tert. butyl peroxide, dicumyl peroxide, tert. butyl peroxide, cumene hydroperoxide, peracetic acid, p-chloro-benzoyl peroxide, cyclohexanone peroxide, methanol, ethanol and n-butanol.

4. The process according to claim 1, in which the transition metal salt is selected from the group consisting of tungsten hexachloride, tungsten oxychloride and molybdenum pentachloride.

5. The process according to claim 1, in which component (b) is a compound of a metal selected from the group consisting of beryllium, magnesium, calcium, zinc and aluminum.

6. The process according to claim 1, in which component (b) is selected from the group consisting of aluminum diethyl monochloride, aluminum triethyl, aluminum diisobutyl hydride and beryllium diethyl.

7. The process according to claim 1, in which the ratio between the transition metal salt and component (b) is from 1:0.5 to 1:100.

8. The process according to claim 1, in which the molar ratio between the transition metal salt and oxygenated compound is from 1:2 to 1:0.1.

9. The process according to claim 1, in which the molar ratio between the transition metal salt and oxygenated compound is 1:0.5.

10. The process according to claim 1, in which the molar ratio between the cycloolefin and transition metal salt is from 50:1 to 10,000:1.

11. The process according to claim 1, in which the molar ratio between the cycloolefin and transition metal salt is from 200:1 to 2,000:1.

12. The process according to claim 1, characterized in that the polymerization is carried out in the absence of inert diluents, the catalyst is prepared in the presence of the monomer, and component (b) is the last catalytic component added to the system.

References Cited

UNITED STATES PATENTS 3,074,918    1/1963    Elenterio        260—93.1

JOSEPH L. SCHOFER, *Primary Examiner.*

L. EDELMAN, *Assistant Examiner.*

U.S. Cl. X.R.

252—442

UNITED STATES PATENT OFFICE
CERTIFICATE OF CORRECTION

Patent No. 3,449,310          Dated June 10, 1969

Inventor(s) Gino Dall'Asta et al.

It is certified that error appears in the above-identified patent and that said Letters Patent are hereby corrected as shown below:

Col. 2, end of line 9, the formula "Al ($C_2H_5$) Br" should be --$Al(C_2H_5)_2Br$--

Col. 2, line 15 should read --aluminum trialkyls, dialkylmonochlorides, and monoalkyldichlorides, such as, e.g., $Al(C_2H_5)_3$; $Al(i-C_4H_9)_3$.

Col. 2, line 25, the value "1.3" at the end of the line should be the ratio --1:3--

Col. 2, line 63, the word "purse" should be --pure--

Col. 3, line 31, the temperature range "80°C to+60°C" should read -- -80°C to +60°C--

Col. 4, line 35, the language "viscosity of toluene" should read --viscosity in toluene---

Col. 6, line 30, the word "air" should read --oxygen--

Signed and Sealed this thirteenth Day of January 1976

[SEAL]

Attest:

RUTH C. MASON
*Attesting Officer*

C. MARSHALL DANN
*Commissioner of Patents and Trademarks*